Oct. 3, 1961   R. K. SHEWMON ET AL   3,003,091
POWER DRIVE APPARATUS
Filed April 6, 1959

INVENTORS.
Ralph K. Shewmon
Jack W. Savage
George A. Neyhouse
BY
C. R. Meland
Their Attorney

United States Patent Office 3,003,091
Patented Oct. 3, 1961

3,003,091
POWER DRIVE APPARATUS
Ralph K. Shewmon, Centerville, and Jack W. Savage and George A. Neyhouse, Dayton, Ohio, assignors to General Motors Corporation, Detroit, Mich., a corporation of Delaware
Filed Apr. 6, 1959, Ser. No. 804,373
5 Claims. (Cl. 318—11)

This invention relates to power drive apparatus that includes an electric motor and variable output speed transmission means and more particularly to a method or pattern of accelerating a load by means of an electric motor and variable output speed transmission means.

Although it is well known to those skilled in the art to drive a load by means of an electric motor and a transmission having a plurality of output speeds, little or no attention has been directed to the problem of peak torques that often are encountered upon shifting of the transmission from a low speed output to a higher speed output. In many instances, the shifting of the transmission causes a very sharp increase in torque requirement for accelerating a load, and rather than eliminating this peak torque requirement, it has been common practice to merely design the motor with enough torque output to handle the peak torque requirement. This often requires that the motor be unduly large in order to meet the peak torque requirements.

It is, accordingly, an object of this invention to provide a method or pattern of acceleration for accelerating a load with a motor and a variable output speed transmission wherein peak torque requirements are eliminated. When this is done, the motor may have a nominal torque output and peak load demands for electrical power are greatly reduced.

Another object of this invention is to provide a method of acceleration for accelerating a load by means of an electric motor and a variable output speed transmission, wherein the load is driven at a low speed by operating the electric motor at a predetermined speed while the transmission is set for a first predetermined output speed, increasing the speed of the motor while the transmission remains in its first predetermined output speed and then causing the transmission to be shifted to provide a higher output speed for the load only after the motor has been accelerated with the transmission in its more favorable speed ratio.

Still another object of this invention is to provide a power drive apparatus that includes a multispeed motor and a transmission having a plurality of output speeds. With this arrangement, the load is driven at a low speed by operating the motor at its low speed while the transmission provides its low speed output. When the load is accelerated, the transmission remains in its low speed setting while the motor has its speed increased toward its higher speed output. After the motor has had its speed increased, the transmission is shifted to its higher speed output to provide still a higher speed for the load.

It has been found that, by practicing the method of acceleration of this invention, the peak torque requirements imposed upon an electric motor are greatly reduced over prior arrangements.

Further objects and advantages of the present invention will be apparent from the following description, reference being had to the accompanying drawings wherein preferred embodiments of the invention are clearly shown.

Figure 1:
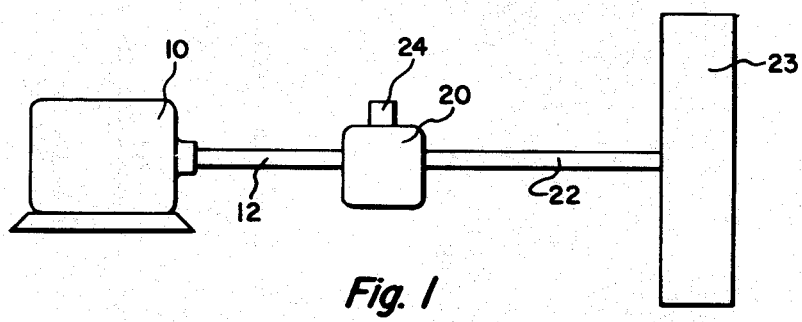
FIGURE 1 is a schematic illustration of an electric motor, a variable output speed transmission and a load that is driven by the motor and transmission.

Referring now to the drawings and more particularly to FIGURE 1, is is seen that an electric motor designated by reference numeral 10 is connected with an output shaft 12. The electric motor 10, as is apparent from FIGURE 2, has a four-pole start winding designated by reference numeral 14 and a four-pole run winding designated by reference numeral 16. The motor also has a two-pole run winding designated by reference numeral 18 and it is, therefore, apparent that the motor wil be operable at two running speeds which may be, for example, 1725 r.p.m. and 3450 r.p.m.

The output shaft 12 is connected with a two-speed transmission designated by reference numeral 20. The transmission 20 has an output shaft 22 which is driven at variable speed ratios with respect to shaft 12. The transmission 20 may be of any conventional design wherein solenoid or coil 24 operates to shift the transmission whenever the coil 24 is energized. As an example of speed ratios that may be used, the shaft 22 may be driven one revolution for every forty revolutions of the shaft 12 when the coil 24 is deenergized. On the other hand, with the solenoid or coil 24 energized, the transmission ratio is shifted so that shaft 22 may rotate one revolution for every 4.0 revolutions of the shaft 12. It will be apparent to those skilled in the art that these transmission ratios might be varied, it only being necessary that some transmission be provided by the shafts 12 and 22 to change the speed ratio between these shafts.

The output shaft 22 is connected with a load 23 which in this case takes the form of a solid flywheel. It is to be understood that the load may take various forms and could, for example, be the rotatable clothes container of a laundry appliance.

Figure 2:
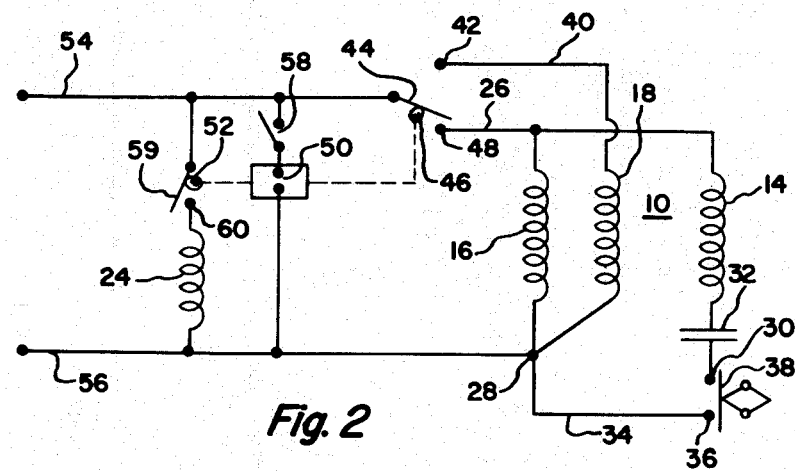
FIGURE 2 is a circuit diagram illustrating a two-speed motor for driving the load and illustrating the electrical connections for operating the variable output speed transmission.

Referring now to FIGURE 2, it is seen that the four-pole start and run windings 14 and 16 are connected with a lead wire designated by reference numeral 26. The opposite side of the four-pole run winding 16 is connected with a junction 28 whereas the opposite side of four-pole start winding 14 is connected with a contact 30 through a starting capacitor designated by reference numeral 32. The junction 28 is connected with a lead wire 34 which is, in turn, connected with a contact 36. The contacts 30 and 36 form a part of a centrifugal switch that also includes movable contactor 38. The centrifugal switch is driven at motor speed and, when the motor is at rest, the contacts 30 and 36 are connected together by contactor 38. The centrifugal switch is preferably designed so that contact 38 leaves contacts 30 and 36 when the motor speed attains approximately 1500 r.p.m. The contactor 38 will re-engage contacts 30 and 36 when the motor speed drops to approximately 1200 r.p.m.

It is seen that the two-pole run winding 18 is connected between junction 28 and a lead wire 40 which is, in turn, connected with contact 42. The contact 42 cooperates with a movable contactor 44 that is driven by a cam designated by reference numeral 46. The movable contactor 44 also cooperates with a fixed contact 48. The cam 46 is driven by a timer motor designated by reference numeral 50 which also drives a second cam designated by reference numeral 52. The timer motor is connected directly across input power lines 54 and 56 and its energization is controlled by a switch 58. The timer cam 52 controls the movement of contactor 59 which, at times, engages a fixed contact 60. When the timer motor 50 is energized, the timer cams 46 and 52 operate contactors 44 and 59 in a predetermined sequence which is more fully described hereinafter.

It is seen from FIGURE 2 that the solenoid shifting coil 24 for shifting the transmission is connected in series with contact 60 and, thus, will be energized whenever the contactor 59 engages the contact 60.

In practicing the method of acceleration of this invention and when it is desired to drive the inertia load 23 at a relatively low speed, the contactor 59 is caused to be disengaged from fixed contact 60 and the contactor 44 is caused to engage the fixed contact 48. The motor will now accelerate as a four-pole motor with both windings 14 and 16 being energized. After the motor exceeds 1500 r.p.m., the start winding 14 is disconnected from the circuit in accordance with conventional practice and the load 23 will be driven at 43 r.p.m. since the motor is operating at 1725 r.p.m. and the transmission is set to provide a forty to one speed ratio. This forty to one speed ratio is due to the fact that, at this time, the transmission shifting coil 24 is not energized.

In following the pattern of acceleration of this invention and when it is desired to increase the speed of load 23 from 43 r.p.m. to, for example, 86 r.p.m., the contactor 44 is caused to be shifted into engagement with fixed contact 42 while contactor 59 remains out of engagement with contact 60 for a predetermined period of time. When contactor 44 is shifted to engage contact 42, a circuit is made for the two-pole winding 18 and the four-pole winding 16 becomes deenergized. The motor will now accelerate towards 3450 r.p.m. with the transmission still maintaining a forty to one speed ratio. This acceleration will take place with the more advantageous speed setting torque-wise of the transmission and it has been found that this greatly reduces the peak torque requirements as compared to the case where the transmission is shifted without overspeeding of the motor in its more favorable speed ratio.

Once the load has attained the 86 r.p.m. speed, which is caused by increasing the speed of the motor for a period of time, the timer arrangement is designed to permit contactor 59 to engage fixed contact 60 whereupon the transmission will be shifted to its 4.0 to 1 speed ratio to provide a 860 r.p.m. speed for the load 23. It is to be observed that, in this method, the load 23 was first accelerated by increasing the speed of the electric motor before the transmission was shifted. The load thus builds up kinetic energy and inertia and, when the transmission is then shifted, the loss of mechanical advantage is not so severe as compared to the case where the transmission is shifted without first overspeeding the motor in its more favorable speed ratio.

It will be appreciated that the sequence switching for controlling the electric motor and the transmission could be accomplished in ways other than by timer operated switches in practicing the acceleration method of this invention. Of course, the control must be such that the motor has its speed increased prior to shifting of the transmission to its higher speed output.

Figure 3:
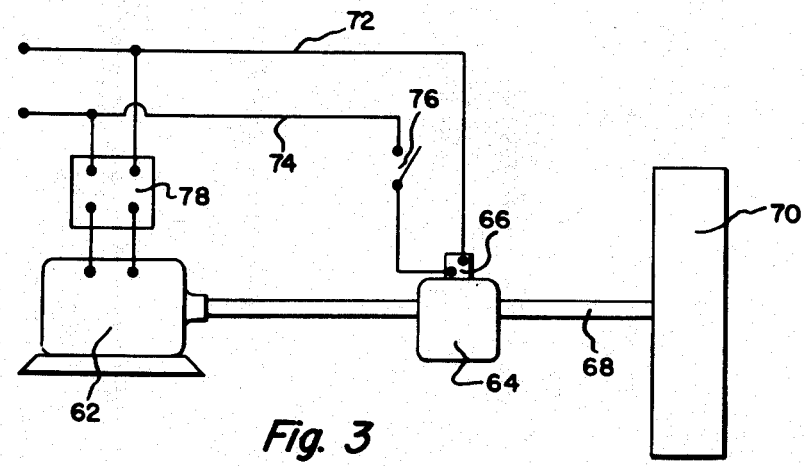
FIGURE 3 is a schematic illustration of a modified method of increasing the speed of an electric motor prior to shifting of the transmission to its higher speed output setting.

In FIGURE 3, a modified arrangement for practicing the method of acceleration of this invention is illustrated. In this figure, an electric motor designated by reference numeral 62 is drivably connected with a two-speed transmission 64 that includes a solenoid 66 for shifting the transmission from a low speed output to a higher speed output. The output shaft 68 of the transmission is connected with a rotatable load designated by reference numeral 70. In this arrangement, like the arrangements of FIGURES 1 and 2, the speed ratio between the motor 62 and the load 70 is changed whenever the solenoid 66 is energized. In FIGURE 3, the solenoid 66 is connected with power input lines 72 and 74 through a switch 76. The motor 62, in FIGURE 3, is energized from power lines 72 and 74 through a frequency changer shown schematically and designated by reference numeral 78.

In the FIGURE 3 embodiment, the load 70 is driven at a low speed by operating the motor 62 at some predetermined speed while maintaining the transmission shifted to provide, for example, a forty to one speed ratio between the motor 62 and the load 70. When it is desired to accelerate the load 70 to a higher speed, the speed of motor 62 is first increased while maintaining the transmission at its forty to one speed ratio to accelerate the load 70. In FIGURE 3, the motor speed is increased by changing the frequency of the voltage applied to the motor which is accomplished by the frequency changer 78. Once the load 70 has been accelerated to some higher speed by increase of the motor speed, the switch 76 is then closed to energize solenoid coil 66 and shift the transmission to its 4.0 to 1 speed ratio. This shifting, of course, occurs only after the motor has been purposely overspeeded and will cause a still higher speed for the load 70. It is seen that the FIGURE 3 embodiment employs the same acceleration principles as the FIGURE 2 embodiment, the only difference being that a different method is illustrated for changing the speed of the electric driving motor. It will be apparent to those skilled in the art, therefore, that this invention contemplates providing a pattern of acceleration wherein the speed of the motor is changed prior to shifting of the transmission.

While the embodiments of the invention as herein disclosed constitute preferred forms, it is to be understood that other forms might be adopted.

What is claimed is as follows:

1. In combination, a load, an electric motor, variable output speed transmission means shiftable to provide first and second output speeds connected between said electric motor and said load for driving said load, means for causing said load to be driven at a first speed including means for operating said electric motor at a first speed while said transmission means is set for a first output speed, means for causing said load to be driven at a higher speed including means for increasing the speed of said electric motor while said transmission means is maintained in its first output speed setting, and means for causing said load to be driven at still a higher speed including means for shifting said transmission to provide a higher output speed only after said motor has accelerated the load with the transmission maintained in its low output speed setting to a point where the motor is operating at its increased speed.

2. In combination, a load, an electric motor, said electric motor having a field circuit that is connectable to provide a first number of effective poles and a second greater number of effective poles, variable output speed transmission means having at least two output speeds connected between said electric motor and said load, means for driving said load at a first speed including means for causing the field circuit of said motor to be operated with its greater number of effective poles while said transmission means is set to provide a first output speed, means for causing said load to be accelerated including means for connecting said field circuit to provide its lesser number of effective poles while said transmission means is maintained in its said first output speed setting, and means for causing said load to be further accelerated including means for shifting said transmission to a higher output speed setting only after said motor has accelerated the load by increase in speed of the motor.

3. In combination, a load, an electric motor having a field circuit connectable to provide a first number of effective poles and a second greater number of effective poles, variable output speed transmission means connected between said electric motor and said load for driving said load, said transmission means having a first speed output and a second higher speed output and including electrically energizable means for shifting said transmission from its first speed output to its higher speed output, means for driving said load at a first speed including means for connecting said motor field circuit to provide said second greater number of effective poles while maintaining said electrically energizable means deenergized, means for driving said load at a greater speed including means for changing the connections of the field circuit of the motor to provide its lesser number of effective poles while maintaining said electrically energizable means deenergized, and means for providing still a higher speed for said load including means for energizing said electrically energizable means to shift said transmission means to its higher speed output during the time that the motor is operating with its lesser number of poles.

4. In combination, a load, an electric motor, variable speed transmission means connected between said electric motor and said load for driving said load, a power circuit, means connected between said power circuit and said motor for varying the frequency of the voltage applied to the motor, means for causing said load to be driven at a first speed including means for setting said transmission means for a first speed output while said motor is being supplied with a voltage of a first frequency, means for causing said load to be driven at a higher speed including varying the frequency of the voltage applied to the motor to increase its speed while maintaining said transmission means in its first setting, and means for shifting said transmission means to increase its output speed to provide still a higher speed for said load.

5. In combination, a driven load, an electric motor, means for driving said load at a first speed including means for setting up a first speed ratio between said motor and load and for causing operation of said motor at a first speed, means for accelerating said load to a higher speed including means for causing an increase in speed of said motor while maintaining said first speed ratio between said motor and load, and means for further increasing the speed of said load including means for changing the speed ratio between said motor and load only after said motor has attained its increased speed.

References Cited in the file of this patent

UNITED STATES PATENTS

| | | |
|---|---|---|
| 2,269,069 | Werner | Jan. 6, 1942 |
| 2,423,243 | Lovely | July 1, 1947 |
| 2,774,924 | Witt | Dec. 18, 1956 |